Figure 1:
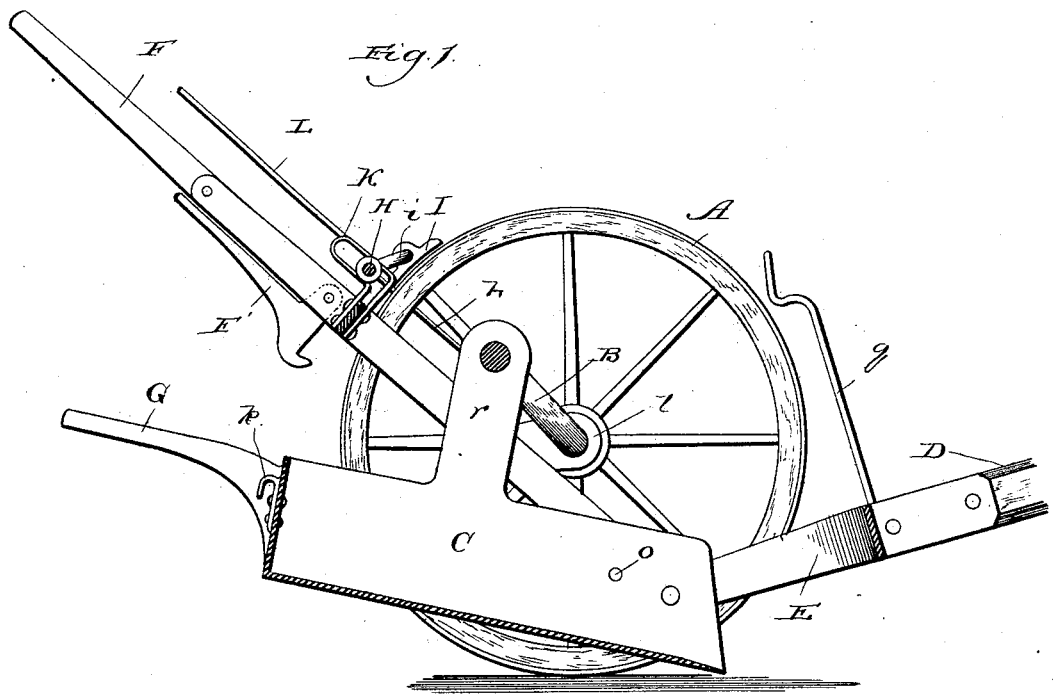

(No Model.) 3 Sheets—Sheet 1.

L. G. HAASE.
ROAD SCRAPING ATTACHMENT.

No. 366,952. Patented July 19, 1887.

Witnesses:
Chas E Gaylord
J. H. Dyrenforth

Inventor:
Leo G. Haase,
By Dyrenforth & Dyrenforth
Att'ys.

N. PETERS, Photo-Lithographer, Washington, D. C.

(No Model.) 3 Sheets—Sheet 2.
L. G. HAASE.
ROAD SCRAPING ATTACHMENT.
No. 366,952. Patented July 19, 1887.
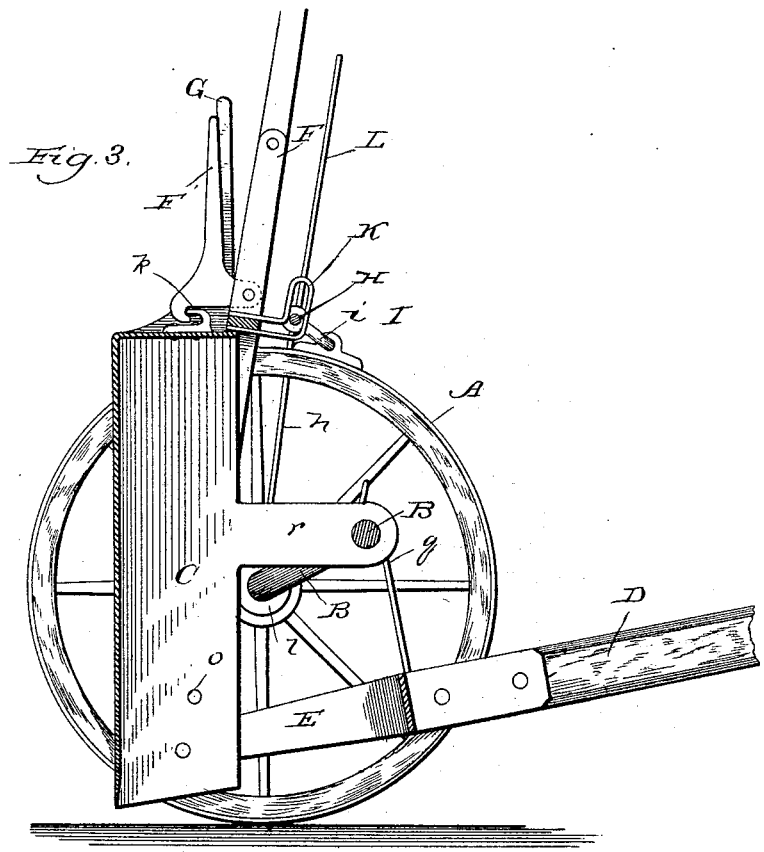
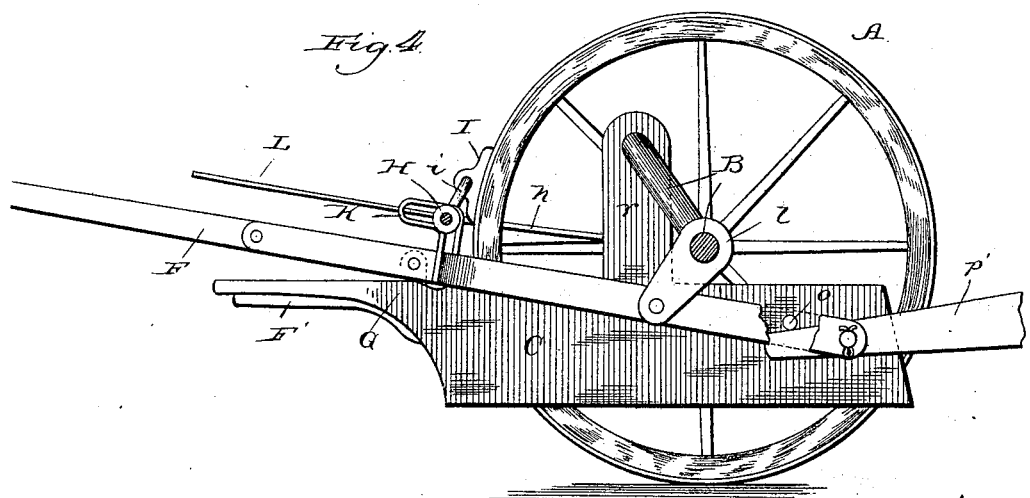
Witnesses:
Chas. E. Gaylord.
J. W. Dyrenforth.
Inventor:
Leo G. Haase,
By Dyrenforth & Dyrenforth
Att'ys (No Model.) 3 Sheets—Sheet 3.
L. G. HAASE.
ROAD SCRAPING ATTACHMENT.
No. 366,952. Patented July 19, 1887.
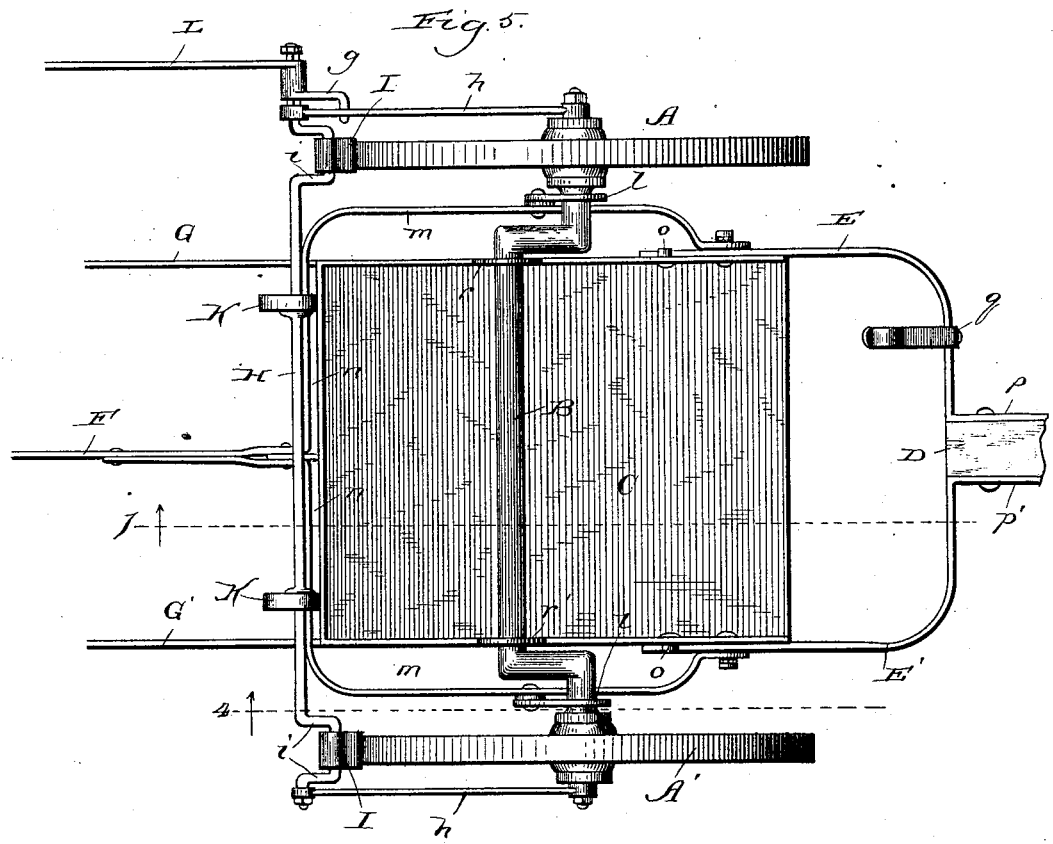
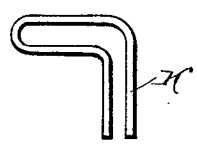
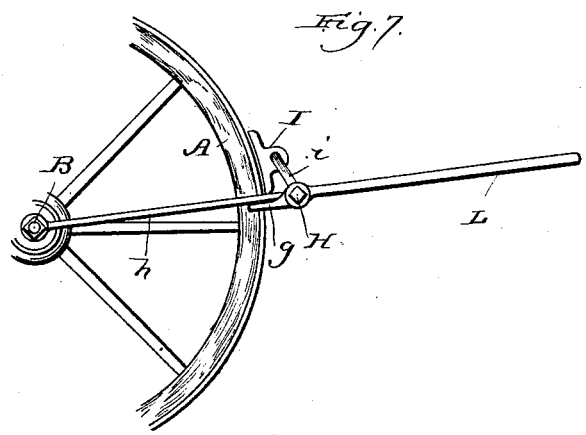
Witnesses:
Chas. E. Gaylord.
J. H. Dyrenforth.
Inventor:
Leo G. Haase,
By Dyrenforth and Dyrenforth
Attys.

United States Patent Office.

LEO G. HAASE, OF HARLEM, ILLINOIS.

ROAD-SCRAPING ATTACHMENT.

SPECIFICATION forming part of Letters Patent No. 366,952, dated July 19, 1887.

Application filed May 3, 1887. Serial No. 236,934. (No model.)

*To all whom it may concern:*

Be it known that I, LEO G. HAASE, a citizen of the United States, residing at Harlem, in the county of Winnebago and State of Illinois, have invented a certain new and useful Improvement in Road-Scraper Attachments; and I hereby declare the following to be a full, clear, and exact description of the same.

My improvement relates particularly to an attachment for road-scrapers of the form involving in its construction a crank-axle, and forming the receptacle for carrying the load to the place of dumping, a pair of wheels, and a scraper or scoop carried by the axle.

Road-scrapers of the class and kind referred to are provided with means for lowering them to the surface to be scraped and for raising and supporting the scoop or scraper when filled, to permit it to be carted away to the place of dumping the load or contents of the scoop. This is performed, when the vehicle has been drawn to the desired spot, by lifting the rear end of the scoop (at a handle which is provided to project backward from the scoop for the purpose) to cause the forward or discharge edge to engage with the ground as a fulcrum, and, by the continued forward pull upon the wheeled vehicle, dump the load by overturning the scoop. This operation is attended with considerable difficulty, inasmuch as it entails upon the operator the lifting of a heavy load, and obviously subjects the animals drawing the vehicle to considerable strain, besides rendering the exact point of dumping uncertain, or preventing accuracy as to the spot upon which the contents of the scraper are to be discharged.

It is my object to provide an attachment whereby the load may be dumped with accuracy upon any desired spot without materially increasing the strain upon the animals in effecting the dumping operation, and at the same time considerably lessening, with respect to the old manner of producing the discharge of the load, as above described, the exertion required on the part of the operator.

My invention consists in the general construction of my improved attachment; and it further consists in details of construction and combinations of parts, all as hereinafter more fully set forth.

Figure 2:
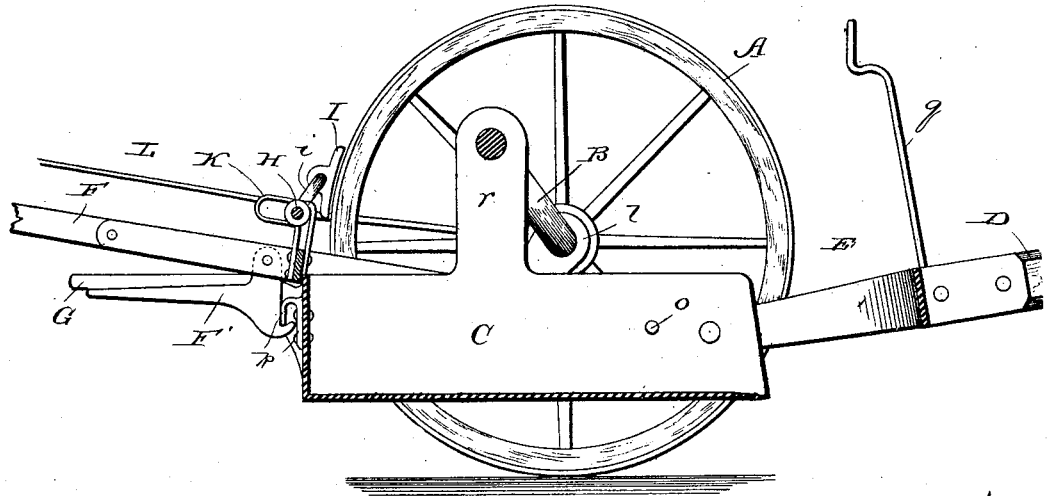

In the drawings, Figure 1 shows, in sectional side elevation, the section being taken on the line 1 of Fig. 5, and viewed in the direction of the arrow, a road-scraper provided with my improved attachment and representing the scoop in position for scraping its load. Fig. 2 shows a similar view of the same, taken on the same line of Fig. 5, but representing the scoop in position to be carted away after being loaded; Fig. 3, a similar view, also on the line 1 of Fig. 5, but representing the scoop in its position of dumping or discharging its contents; Fig. 4, a sectional view in side elevation, taken on the line 4 of Fig. 5, and viewed in the direction of the arrow; Fig. 5, a plan view of the machine with the scoop in the position illustrated in Fig. 2; Fig. 6, a detail in side elevation; and Fig. 7, a broken view of the machine, showing my improved attachment in side elevation.

A and A' are the wheels, connected together to rotate upon the journal ends of a crank-axle, B.

C is the scoop or scraper proper, having lateral perforated vertical hangers $r$ and $r'$, through which the axle B extends, whereby the scoop is loosely hung between the crank portions of the axle. The tongue or pole D is bolted at its rear end between parallel arms $p$ and $p'$ of brackets E and E', respectively pivoted to opposite sides of the scoop C, where stops $o$ are provided at the upper edges of the brackets behind their pivotal points to prevent backward tilting of the scoop.

F is a lever bifurcated at one extremity to produce arms $n$, extending in opposite directions along the rear end of the scoop, and arms $m$, extending along opposite sides of the same, being pivoted near their extremities at the points of pivoting the brackets E and E'—that is, forward of the axle B, upon which the scraper is hung. Links $l$ serve to connect the arms $m$ pivotally with the journal portions of the crank-axle B. On the bracket E is a catch, $q$, and pivoted to the lever F to hang below it is a dog, F', to engage automatically by its own weight with a catch or hook, $k$, on the rear end of the scoop, from opposite sides of which also extend handles G and G'.

The parts of the device thus described are old, producing a form of road-scraper to which my improved attachment hereinafter described is applicable, and the device operates as follows: The scoop is released by disengaging the dog F' from the hook k, and lowered to the position shown in Fig. 1 by raising the lever F and tilting the scoop from the handle G to bring its forward edge into contact with the surface to be scraped by the draft of the animals hitched to the pole D. When filled, the scoop is raised to the position shown in Fig. 2 (in which the load is to be carted to the place of dumping it) by downward pressure upon the bar F, which produces engagement of the dog F' with the catch k, whereby the loaded scraper is held in horizontal position. When carted to the place of dumping, were my improved brake attachment not applied, the lever F would have to be raised, and with it the entire load, to tilt the scoop and bring its discharge end into contact with the ground, when, with such contact as a fulcrum, the forward draft on the machine would overturn the scoop (which would be held in such position by the catch q) and spill its contents as near the desired location as the operator could manage to produce the overturning operation.

My attachment comprises a shaft, H, having cranks i and i', respectively, near opposite ends in line with the wheels A and A', and carrying each a brake-shoe, I; a link, h, on each end of the shaft beyond the crank near such end, for connecting the shaft with the opposite ends of the main axle B, either outside of the wheels, as shown in Fig. 5, or between them; yokes K, secured to the arms n of the lever F at their vertical portions, to cause the shaft H to extend through their horizontal portions, forming backwardly-extending elongated openings, and a lever, L, secured upon the left-hand end of the shaft H and provided with a stop, g, to extend underneath the adjacent link h.

When my attachment is adjusted in position upon the road-scraper, the scoop may be overturned to dump the load at any desired place by lifting the lever L to turn the shaft H and set the brakes on the cranks i and i' against the wheels, whereby the forward draft upon the machine rotates the wheels, which carry the scoop around with them, and consequently dump its contents without material extra strain upon the animals or operator.

What I claim as new, and desire to secure by Letters Patent, is—

1. In a wheeled road-scraper, the combination of a scoop adapted to scrape the load by the forward movement of the road-scraper and forming the receptacle for carrying the load to the place of dumping, and loosely hung upon the axle, and a brake connected with the said axle and movable into engagement with the wheels to produce by the continued forward rotation thereof dumping of the said scoop, substantially as described.

2. In a wheeled road-scraper, the combination of a scoop adapted to scrape the load by the forward movement of the road-scraper and forming the receptacle for carrying the load to the place of dumping, and loosely hung upon the axle, a crank-shaft connected with the axle of the machine and the said scoop, and a brake-shoe on the crank portion of the said shaft in line with a wheel, and movable into engagement therewith to produce by the continued forward rotation thereof dumping of the said scoop, substantially as described.

3. In a wheeled road-scraper, the combination of a scoop adapted to scrape the load by the forward movement of the road-scraper and forming the receptacle for carrying the load to the place of dumping, and loosely hung upon the axle, a crank-shaft connected with the axle of the machine, a yoke connecting the crank-shaft with the said scoop, and a brake-shoe on the crank portion of the said shaft in line with a wheel, and movable into engagement therewith to produce by the continued forward rotation thereof dumping of the said scoop, substantially as described.

4. A dumping attachment for a wheeled road-scraper, comprising, in combination, a crank-shaft, H, yokes K, for connecting the shaft H with the scoop or scraper, brake-shoes I on the crank portions of the shaft H in line with the wheels, and links h, for connecting the shaft H with the axle of the machine, substantially as and for the purpose set forth.

5. A dumping attachment for a wheeled road-scraper, comprising, in combination, a shaft, H, having cranks i and i' in line with the wheels, yokes K on the shaft H, for connecting it with the scoop or scraper, brake-shoes I on the cranks i and i', links h, for connecting the shaft H with the axle of the machine, a lever, L, on the shaft H, and a stop, g, substantially as and for the purpose set forth.

LEO G. HAASE.

In presence of—
FRANK L. DOUGLAS,
GEORGE C. COOK.